UNITED STATES PATENT OFFICE 2,614,943

METHOD OF PRODUCING MIRRORS

Alfred M. Franza, New York, N. Y.

No Drawing. Application July 11, 1949,
Serial No. 104,156

1 Claim. (Cl. 117—35)

This invention relates to the art of silvering or re-silvering mirrors, and to solutions by means of which such art may be successfully practiced.

The art of producing mirrors is an ancient one which has grown up empirically. It is an art in which relatively few major changes have been made. Yet I have observed that about 40–50% of mirrors made throughout the mirror industry deteriorate in less than a year, becoming cloudy, darkened, peeled or streaked. There is thus still a need for an improved mirror which is not subject to these defects.

It is, accordingly, one of the objects of this invention to produce mirrors which retain their brightness and other qualities for a period of many years without deteriorating.

Another object of the invention resides in the production of copper alloy long lasting mirrors.

A further object of the invention is in the preparation of solutions for producing my new mirrors and in the procedure to be followed in carrying out silvering or re-silvering in accordance herewith.

Other and further objects and advantages will be understood and appreciated by those skilled in this art, or will be apparent or pointed out hereinafter.

I have discovered that mirrors can be produced in accordance with my present invention, which will not become cloudy, darkened, peeled, or streaked even after a number of years.

In making mirrors according to my new discovery, I prepare four solutions, as follows:

*Solution 1.*—Silver nitrate is dissolved well in distilled water and the solution added to 26° Baumé ammonia water in the respective relative proportions of 1 pound of silver nitrate to 192 oz. or 6 quarts of distilled water and 12 oz. of the ammonia water. This solution is then filtered through three thicknesses of filter paper.

*Solution 2.*—Rochelle salt (the double tartrate of sodium and potassium) is dissolved well in distilled water in the proportion of 4 pounds of Rochelle salt to 2 gallons of water. This solution is then filtered through 3 thicknesses of filter paper.

*Solution 3.*—Copper sulfate (crystalline) is dissolved well in distilled water and 26° Baumé ammonia water is added thereto in the respective relative amounts of 4 oz. of copper sulfate to 1 gallon of water and 6 oz. of ammonia water. The solution is then filtered through 3 thicknesses of filter paper.

*Solution 4.*—Tartaric acid and ammoniacal copper sulfate (solution 3) are dissolved well in distilled water in the respective relative proportions of 2 oz. to 7 oz. to 1 gallon. The solution is then filtered through 3 thicknesses of filter paper.

In use, 7 oz. of solution 1, 7 oz. of solution 2, and 3 oz. of solution 4 are thoroughly mixed in 1½ gallons of distilled water and poured on the previously prepared glass surface. In 30 minutes the "mud" is washed off as by means of a chamois skin. A second coat is similarly applied and similarly removed in another 30 minutes. Then the coating is dried with chamois skin and all traces of "mud" eliminated. The coating on the glass is then covered with a film of light orange shellac dissolved in denatured alcohol. When the shellac is dry, a coat of standard mirror back paint is applied and the mirror is then complete.

The glass surface is prepared for silvering as follows: To 1 gallon of water add ½ oz. tin chloride crystals and 2 tablespoonfuls of white putty powder (white putty). Apply to glass and wash off well. The solution is applied to the glass with a soft felt block and removed with a bristle brush. The glass is kept wet and placed on a silvering table, whereupon the silvering preparation above defined is poured on the glass without giving the glass a chance to dry. Care in the preparation of the glass for the silvering is important with respect to the results secured.

The presence of ammoniacal copper sulfate and silver nitrate with Rochelle salt results in a reducing and alloying action to form copper and silver which become alloyed or amalgamated to produce a copper-silver mirror surface of exceptional brightness and durability. Such mirror surface is stable and long lasting without streaking, peeling, blackening or becoming cloudy.

It will be understood that the foregoing is illustrative and not limitative and that the details thereof may be varied without departing from the scope or principles of the invention as defined by the appended claim.

Having thus described my invention, what I claim as new and desire to secure by Letters Patent, is:

The method of making mirrors which are resistant to deterioration for many years consisting essentially of admixing 7 parts, by weight, of a filtered solution composed of 1 pound of silver nitrate and 12 ounces of 26° Baumé ammonia water in 192 ounces of distilled water, with 7 parts, by weight, of a filtered solution composed of 4 pounds of Rochelle salt in 2 gallons of distilled water and with 3 parts, by weight, of a filtered solution composed of 2 ounces of tartaric acid and 7 ounces of aqueous ammoniacal copper sulfate in 1 gallon of distilled water, the ammoniacal copper sulfate having been previously prepared by dissolving 4 ounces of crystalline copper sulfate and 6 ounces of 26° Baumé ammonia water in 1 gallon of distilled water, and applying the admixture to a previously prepared glass surface, the method being carried out at room temperature without the application of heat.

ALFRED M. FRANZA.

REFERENCES CITED

The following references are of record in the file of this patent:

UNITED STATES PATENTS

| Number | Name | Date |
|---|---|---|
| 201,497 | Carney | Mar. 19, 1878 |
| 1,208,507 | Dalby | Dec. 12, 1916 |
| 1,588,510 | Wear | June 15, 1926 |
| 1,935,520 | Peacock | Nov. 14, 1933 |
| 1,982,774 | Winkler et al. | Dec. 4, 1934 |